Oct. 11, 1938.  B. CHANCE  2,132,676
AUTOMATIC STEERING MEANS
Filed May 4, 1935   2 Sheets-Sheet 1

WITNESS:

INVENTOR
Britton Chance
BY
Augustus B. Stoughton
ATTORNEY.

Oct. 11, 1938.  B. CHANCE  2,132,676
AUTOMATIC STEERING MEANS
Filed May 4, 1935  2 Sheets-Sheet 2

WITNESS:

INVENTOR
Britton Chance
BY
Augustus B. Stoughton,
ATTORNEY.

Patented Oct. 11, 1938

2,132,676

UNITED STATES PATENT OFFICE 2,132,676

AUTOMATIC STEERING MEANS

Britton Chance, Mantoloking, N. J.

Application May 4, 1935, Serial No. 19,824

2 Claims. (Cl. 172—282)

One object of the present invention is to bend a ray of light or radiant energy prior to its projection onto electronic cells or valves and in response to follow-back mechanism operated by effects caused by the travel of the incidence of the ray or beam in respect to the cells or valves, due to deviation from the course.

Another object of the invention is to provide an optical system in which deflection of a ray or beam is magnified so that the automatic steering instrument can be made comparatively short.

Other objects of the invention will appear from the following description at the end of which the invention will be claimed.

Generally stated, the invention consists in means for providing a beam of radiant energy or light, a reflector or optical means rotatably fixed in space for normally directing said beam into a position fixed in space, electronic valve devices or cells bi-sected by the incidence of said beam when in normal position in space and upon angular displacement from such position operative to produce different effects, and follow-back means actuated by such effects and operative to change the incidence of the beam with respect to said optical means or reflector to correlate said effects.

The invention also consists in a group of electronic valve devices or cells movable upon deviation from the course and having means providing a directionally fixed beam or ray of radiant energy, and a compass card provided with a reflector which sends the beam or ray back to the cells or valves with a magnification of the angle of their displacement.

In the following description reference will be made to the accompanying drawings forming part hereof and in which, Figure 1 is a diagrammatic perspective view illustrating optical means operated by the follow-back mechanism for bending the ray or beam prior to its reflection by the compass card reflector.

Figure 1:
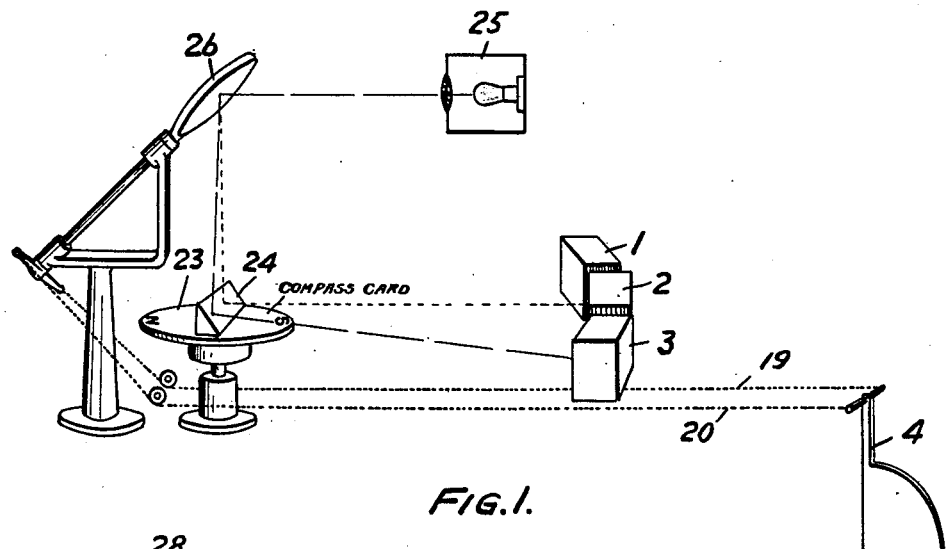
Figure 4:
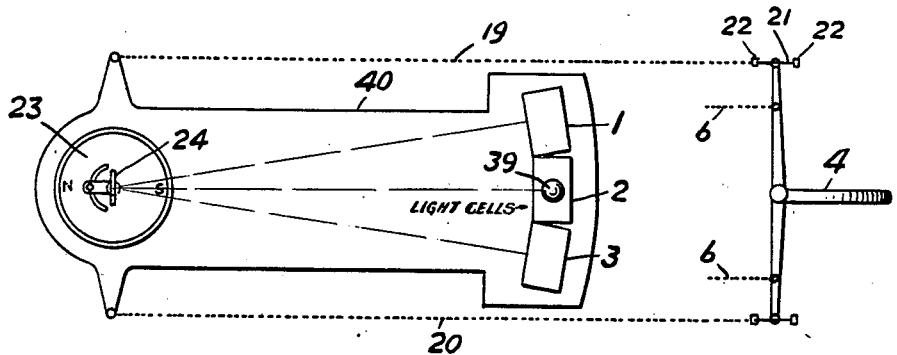
Figure 4 is a similar view illustrating another modification.

Referring to Figure 1 there is a reflector 24 mounted on the compass card 23. The source 25, which is mounted on the craft in the position shown, emits a beam or ray of radiant energy or light which falls upon the turnably mounted reflector 26 and is by it reflected on the mirror 24. The light sensitive devices 1, 2 and 3 are mounted on the craft, for example as shown in Fig. 4, so that their position is changed when the craft changes its course. From the mirror 24 when the craft or vessel is on its course the beam or ray falls on the cell 2. Should the vessel or craft deviate from its course one or the other of the cells 1 and 3 will pass the beam of light and be energized and will effect actuation of the rudder 4 in proper direction for correcting the deviation, through the instrumentalities described hereinafter. Thereafter the follow-back mechanism comes into action and turns the reflector 26 so that the ray or beam is caused to fall again on the middle cell 2.

Figure 2:
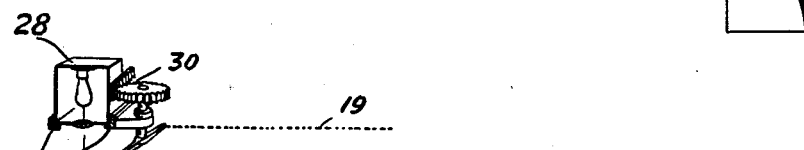
Figure 2 is a similar view illustrating mechanical means employed for the purpose recited in the description of Figure 1.

The modification shown in Figure 2 as to its construction and operation is as above described except as follows: In this case the light source 28 or source of radiant energy is bodily moved along the rails 29 through the intervention of the rack and gear 30.

Figure 3:
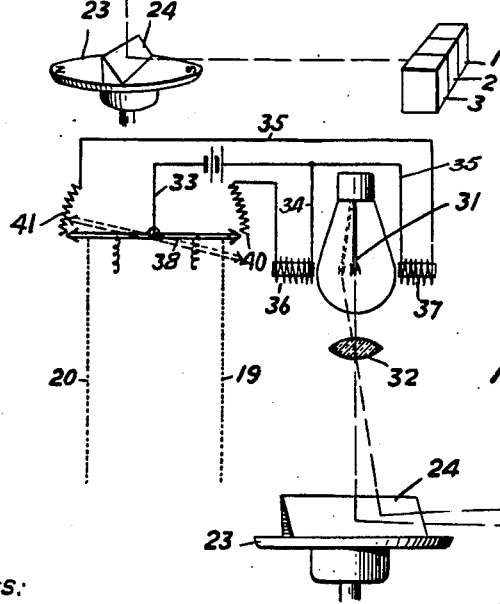
Figure 3 is a view illustrating diagrammatically electrical means as a modification.

The construction and mode of operation of the modification illustrated in Figure 3 are as above described except that the filament 31 is shifted which causes the beam or ray to pass through the lens 32 at different points away from its center so that the ray is bent. One way to shift the filament 31 is to provide a relay circuit 33 having two branches 34 and 35, each containing an electromagnet 36 and 37 and resistances 40 and 41, and controlled by the spring balanced contact 38 actuated by the cables 19 and 20 of the follow-back mechanism. As shown in dotted lines, the lever 38 is supposed to have been shifted to the dotted line position and in that position the circuit is by 33, 41, 35, magnet coil 37 back to the battery. The coil 37 is energized and the filament is polarized so that it assumes the dotted line position.

The construction and mode of operation of the modification illustrated in Figure 4 are as above described except as follows: The source of the ray or beam 39 is mounted on the cell 2 and falls upon the reflector 24 mounted on the compass card 23. The result of this is that upon deviation from the course the angle at which the beam falls on one or the other of the cells 1 and 3 is greater than the angle of deviation. By reason of this deviation the instrument, as a whole, can be made comparatively short. In the drawings the cells are shown as mounted upon a carrier 40 pivoted concentrically with the compass card and moved independently of the compass card by the cables 19 and 20 of the follow-back mechanism. To change the course the reflector 24 may be shifted on the compass card, or the electronic valve devices or light cells moved.

Figure 5:
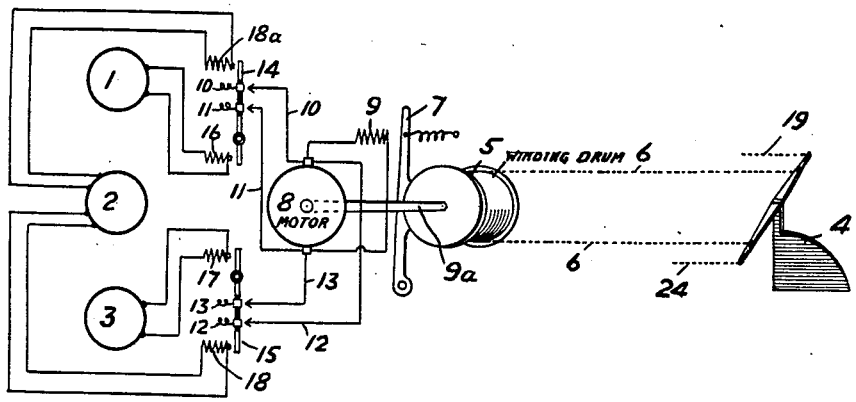
Figure 5 is a diagrammatic lay-out typical of circuits and connections that may be employed.

Fig. 5 illustrates a rudder-actuating mechanism which may be employed with any of the above-described devices. 5 is a drum for turning the rudder 4 by way of the connections or cables 6. The drum 5 is normally locked by the spring pressed brake 7. The motor 8, through the shaft 8a, turns the drum and the rudder in either direction and when the motor is energized the electro-magnet 9, included across the motor, is energized to release the brake 7. The motor may be run in one direction when the motor circuit 10, 11 is energized, and in the other direction when the motor circuit 12, 13 is energized. The contacts 14 and 15 serve to close and to open the respective motor circuits. When the cell 1 is energized by the passage across it by a beam or ray of light the contact 14 is closed by the electro-magnet 16 included in the circuit of that cell and similarly when the cell 3 is energized the motor circuit is closed by the contact 15 under the infleunce of the electro-magnet 17 included in the circuit of the cell 3. When the cell 2 is energized, the electro-magnets 18a and 18 operate to open both motor circuits and to lock the rudder. The follow-back mechanism of any of the above-described devices is operated by the rudder and the cables 19 and 20. In connection with the cables, there is provided some lost motion to produce a dwell in the operation of the follow-back mechanism in respect to the rudder movement. One means for providing lost motion is indicated in Figure 4 in which the rods 21 are afforded endwise movement between the stops or buttons 22.

The cables 19 and 20 of Fig. 5 correspond to the similarly designated cables of the other figures and the optical system of Fig. 5 may be returned to normal by means of any of the follow-back mechanisms above described.

It will be obvious to those skilled in the art, to which the invention relates, that modifications may be made in details of construction and arrangement and in matters of mere form without departing from the spirit of the invention which is not limited to such matters or otherwise than as the prior art and the appended claims may require.

I claim:

1. In apparatus for maintaining a mobile object on a predetermined course, a compass member, a horizontal support turnable about the axis of said compass member, a pair of devices responsive to radiant energy mounted in spaced relation to each other on said support, another device responsive to radiant energy mounted on said support between said first-mentioned devices, a reflector on said compass member, a source of a beam of radiant energy mounted on said other device and arranged to project the beam onto said reflector, the beam being reflected by said reflector onto said other device when said support is in normal position and onto one of said first-mentioned devices whenever said support turns about the axis of said compass member, electrical control means energized by said first-mentioned devices whenever the beam impinges on one of such devices, means controllable by said other device for positively maintaining said control means deenergized when said support is in normal position, and follow-back means actuated in response to energization of said control means to return said support to normal position.

2. In apparatus for maintaining a mobile object on a predetermined course, a compass member, a horizontal support turnable about the axis of said compass member, a pair of devices responsive to radiant energy mounted in spaced relation to each other on said support, another device responsive to radiant energy mounted on said support between said first-mentioned devices, a reflector on said compass member, a source of a beam of radiant energy mounted on said other device and arranged to project the beam onto said reflector, the beam being reflected by said reflector onto said other device when said support is in normal position and onto one of said first-mentioned devices whenever said support turns about the axis of said compass member, electrical control means energized by said first-mentioned devices whenever the beam impinges on one of such devices, additional control means energized by said other device when the beam impinges thereon, and follow-back means actuated in response to energization of said first control means to return said support to normal position.

BRITTON CHANCE.